Dec. 6, 1966 L. GOLDMAN ET AL 3,289,793
SEALED BRAKE
Filed Sept. 4, 1964 2 Sheets-Sheet 1

INVENTOR.
LEO GOLDMAN
JAMES M. PRANGE
BY Strauch Nolan & Neale
ATTORNEYS

Dec. 6, 1966   L. GOLDMAN ETAL   3,289,793
SEALED BRAKE

Filed Sept. 4, 1964   2 Sheets-Sheet 2

INVENTOR.
LEO GOLDMAN
JAMES M. PRANGE
BY Strauch, Nolan & Neale
ATTORNEYS

United States Patent Office 3,289,793
Patented Dec. 6, 1966

3,289,793
SEALED BRAKE
Leo Goldman, Windsor, Ontario, Canada, and James M. Prange, Dearborn Heights, Mich., assignors to Rockwell-Standard Corporation, Pittsburgh, Pa., a corporation of Delaware
Filed Sept. 4, 1964, Ser. No. 394,485
3 Claims. (Cl. 188—18)

The present invention refers to automotive vehicle wheel and brake assemblies and more particularly to sealed, compact wheel hub and brake assemblies in which the wheel hub forms part of the brake drum enclosure.

In conventional wheel and brake assemblies the brake drums are generally secured inside of the wheel to a flange on the wheel hub or driving member. The open side of the drum which is directed inwardly in most instances is covered by a backing plate secured to an axle flange which may support the brake mechanism. An assembly of this type is disclosed in U.S. Patent 2,599,013. In other instances the brake mechanism may be supported on a spider or support attached to the axle and the open side of the drum be covered by a cover plate.

In conventional road vehicles the backing or cover plate will normally be sufficient to exclude dirt from the interior of the drum. However, in off-highway vehicles which often travel through mud and water, effective sealing of the brake drum has been difficult primarily because of the fast wear of the seal caused by the rotating brake drum and the influence of the heat from the brake drum and the contamination of the seal with water and mud.

The present invention provides a novel sealing arrangement for this type of closed wheel hub and brake assembly which overcomes the above difficulties.

In addition, in prior closed wheel hub and brake assemblies the size of the brake and brake mechanism which could be installed within the enclosure of the wheel hub and drum was too limited to accommodate heavy duty brakes required in heavy duty and off-highway equipment. The present invention overcomes this difficulty and makes it possible to incorporate novel, compact, heavy duty brake mechanisms within the confines of the wheel hub and brake drum enclosure.

Finally, the present invention makes it possible to install compact automatic emergency brake mechanisms in addition to the service brake mechanisms within the confines of the wheel hub and brake drum enclosure.

Accordingly, it is an important object of the present invention to provide a sealed wheel hub and brake assembly incorporating novel, compact, heavy duty brake mechanisms suitable for heavy duty and off-highway operations.

It is another object of the present invention to provide novel automatic emergency brake mechanisms within the confines of a sealed wheel hub and brake drum enclosure.

It is a further object of the present invention to provide novel sealed brake mechanisms which can be inspected, removed and serviced without removal of the wheel and tire.

Other objects and novel features of the present invention will become evident from the following detailed description in connection with the appended drawings in which.

Figure 1:
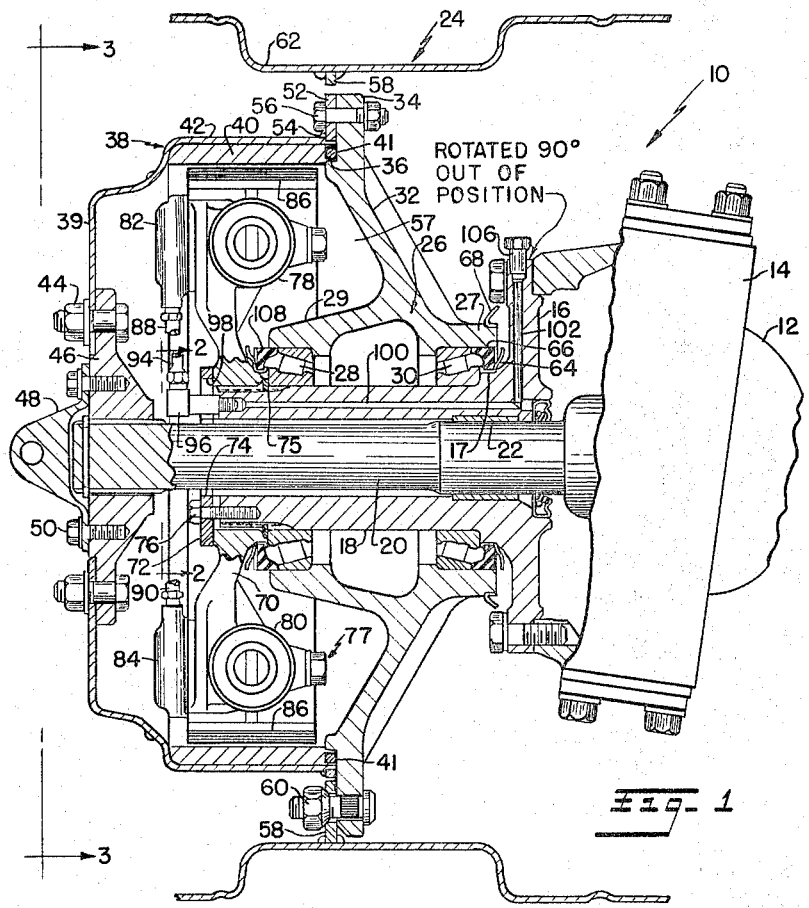
FIGURE 1 is a longitudinal section through the novel wheel hub and brake assembly of the present invention with part of the wheel hub rotated 90° out of true position.

With reference to the drawings, FIGURE 1 illustrates one side of a front steer drive axle 10 including an axle housing 12 which extends into a universal joint assembly 14 of conventional construction. The steering mechanism, which is also conventional, has been omitted for clarity. Attached to the casing 14 is the radial flange 16 of a non-rotatable spindle 18 through which a wheel drive shaft 20 extends, the shaft being journaled in bushing 22. The wheel drive shaft 20 is drivingly connected within casing 14 by means of a universal joint (not shown) to an axle drive shaft (not shown) in the usual manner to transmit driving forces to a wheel 24 to which the wheel drive shaft 20 is connected by means presently to be described.

It will be understood that the steer drive axle construction shown is illustrative only and a non-driving front or rear axle may be substituted by omitting the wheel drive shaft 20 and substituting a conventional steering knuckle for the spindle 18 and casing 14, the construction of which is well known in the art.

The spindle 18 supports a wheel hub 26 on antifriction bearings 28 and 30. Wheel hub 26 has a radially outwardly extending flange 32 provided at its circumference with a flat faced generally vertical portion 34 terminating at its inner edge in an outwardly extending shoulder 36 which supports the inner face of a brake drum 38. The drum is of composite structure comprising an inner friction surface 40 attached to an outer shell 42 which has a transverse wall 39 opposite the hub flange 32 by which drum 38 may be attached as by screw and nut assemblies 44 to a drive flange 46 splined to the end of wheel drive shaft 20. An O-ring seal 41 is provided between drum 38 and hub flange 32. If desired, shell 42 may be permanently secured to flange 46, as by welding. The end of wheel drive shaft 20 is enclosed by a combination cover and hold down or lift hook 48 attached to the drive flange 46 by screws 50.

Figure 3:
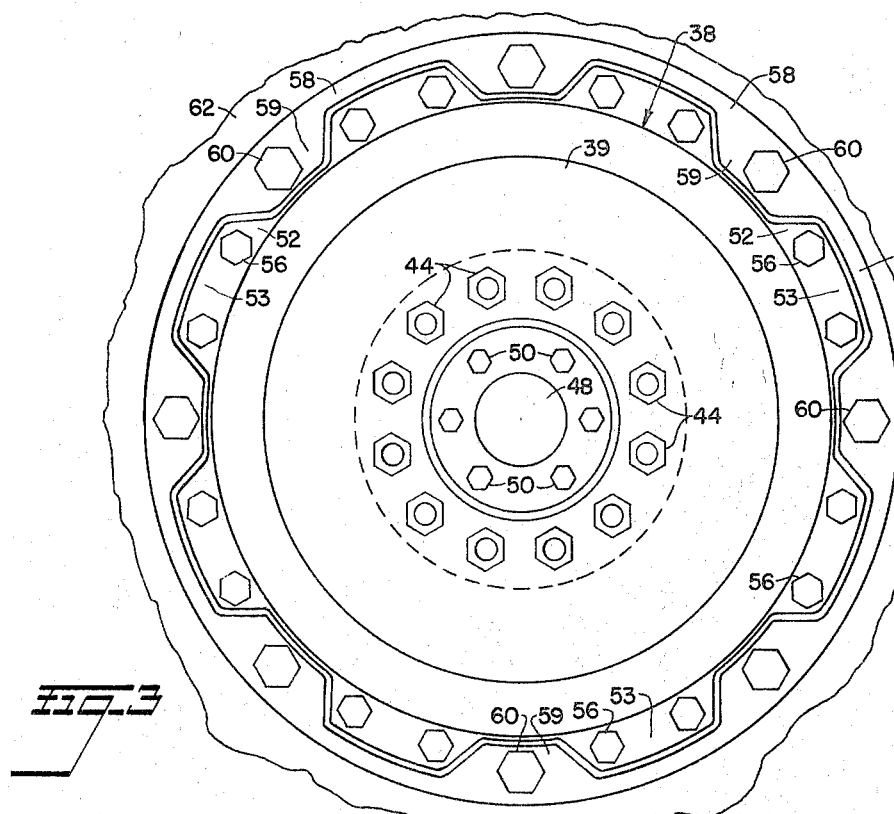
FIGURE 3 is a front view of the assembly of FIGURE 1 as seen in the direction of the arrows 3—3.

The inner open end of the brake drum 38 is provided at its edge with a radial flange 52 welded thereto as at 54. The flange 52 has a notched periphery as shown in FIGURE 3 for a purpose to appear. The flange 52 abuts the flat side of the hub portion 34 and is attached thereto by screw and nut assemblies 56 thus forming with the hub 26 a sealed brake chamber 57 around the spindle 18 and rotatable with the hub as a unit by means of the wheel drive shaft 20.

Also attached to the flat hub portion 34 by stud and nut assemblies 60 is a wheel flange 58 which also has a notched periphery as shown in FIGURE 3. The wheel flange 58 carries the wheel rim 62 of the wheel 24. It will be seen from FIGURE 3 that the flanges 52 and 58 have their radially projecting portions 53 and 59, respectively, positioned in staggered meshed relation in the same plane to allow individual fastening of the flanges to the hub portion 34. Thus, it is possible to remove the brake drum 38 without first having to remove the wheel for easy access to the brake mechanism.

The chamber 57 between the brake drum 38 and hub 26 is sealed by a sealing member 64 of neoprene or other like resilient material secured on a seat 17 of the spindle flange 16 inwardly of the inner wheel bearing 30. The radially compressible sealing lip 66 of seal 64 abuts tightly against the end face of the cup of inner wheel bearing 30 thus effectively sealing the opening between the wheel hub 26 and spindle 18. Attached to the outside of the wheel hub bearing seat portion near the edge thereof is a slinger 68 which, when the wheel hub rotates, throws moisture and dirt outwardly away from the seal 64.

The outer end of the spindle 18 is splined adjacent bearing 28 to non-rotatably support a member or spider 70 which is secured to the spindle against axial displacement by a plate 72 having a large central aperture 74 through which the wheel drive shaft 20 extends, plate 72 being fastened to the spindle by screws 76.

A retainer ring 75 carried by the spindle 18 is interposed between the hub of the spider 70 and the outer wheel bearing 28 to permit removal of the spider and the brake mechanism without requiring that the vehicle be jacked up and the tire removed. Accordingly, the entire brake assembly can be inspected, serviced or replaced with the wheels on the ground.

Figure 4:
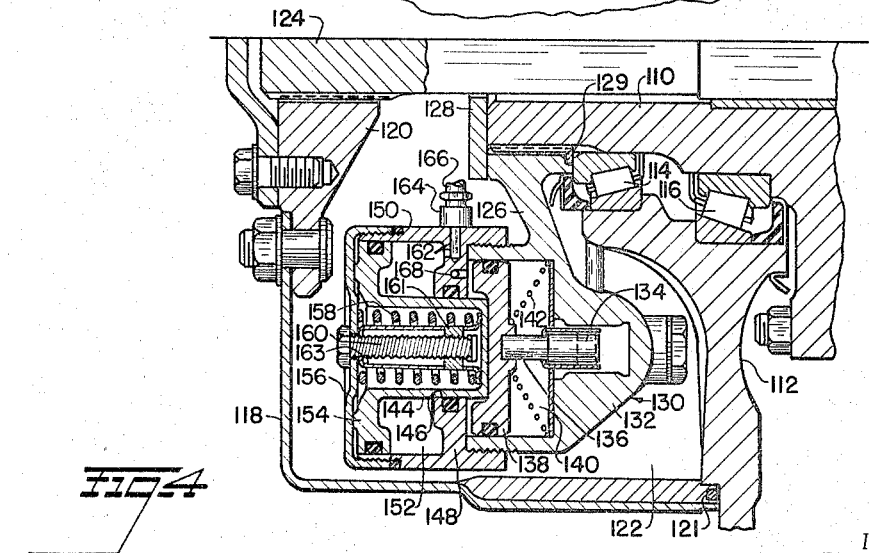
FIGURE 4 illustrates an alternate embodiment of FIGURE 1 incorporating an emergency brake mechanism in addition to the service brake mechanism.

The spider 70 forms part of the brake mechanism 77 contained within the chamber 57 and carries at opposite ends identical brake shoe actuator housings 78 and 80 which embody a wedge and roller brake shoe actuating mechanism of a type disclosed in U.S. Patent 3,037,584 or co-pending application, Serial No. 286,038 which is a further improvement thereof. These actuator mechanisms are adapted, when put in operation by the fluid pressure motors 82 and 84, respectively, which are attached to the actuator housings 78 and 80, to spread brake shoes 86 apart against the friction surface 40 of the brake drum 38. Part of a similar wedge and roller brake shoe actuating mechanism is illustrated in FIGURE 4.

Due to the combination of fluid and mechanical forces and the possibility of changing the angle of the wedge actuator as more fully described in the aforementioned U.S. patent and pending application a variety of braking requirements can be met without increasing the size of the brake or the brake actuating mechanism. The wedge arrangement in the brake actuating mechanism acts as a force multipler and thus it is possible to provide more powerful brakes in the space available within the brake drum and hub than has been possible in similar known wheel hub and brake assemblies.

Figure 2:
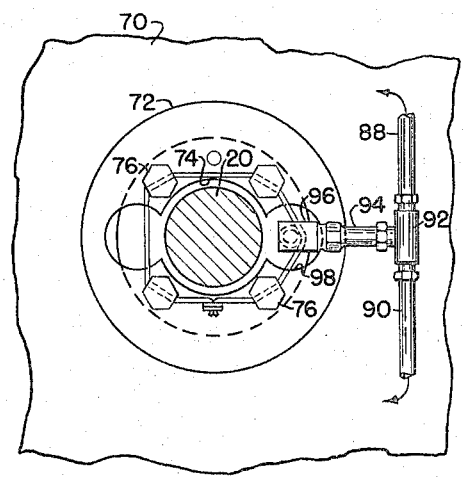
FIGURE 2 is a front view of the brake line connector assembly as seen in the direction of the arrows 2—2 in FIGURE 1.

With further reference to FIGURE 2, the fluid pressure motors 82 and 84, which may be operated by air, vacuum or hydraulic fluid, are operatively connected by conduits 88 and 90, respectively, to a T-connector 92 leading through a branch 94 into an elbow connector 96. Elbow connector 96 extends through an aperture 98 in plate 72 and is screwed axially into the spindle 18. Passage 100 intersects a transverse passage 102 extending through spindle flange 16 to a fitting 106 for connection to a brake line (not shown) which connects the fluid pressure motors 82, 84 of brake 77 with the braking system of the vehicle. Thus, fluid under pressure for brake actuation enters the chamber 57 through passages provided in the spindle 18 and flange 16.

A sealing member 108, which is similar to seal 64, is provided between the end face of the cup of outer wheel bearing 28 and the spider 70 adjacent bearing 28 to prevent leakage of lubricant into the brake mechanism.

With reference to FIGURE 4, it has become increasingly desirable to provide commercial and other heavy duty vehicles with independent safety brake mechanisms to brake the vehicle automatically when the service brakes fail. These safety brake mechanisms may be conveniently constructed to be usable also as parking brakes.

In former known wheel hub and brake assemblies of the present type it was not possible to incorporate additional conventional safety brake mechanisms within the enclosure formed by the brake drum and wheel hub due to the limited space available and it was necessary to mount such mechanisms outside the wheel remote from the brake. Such constructions were unsatisfactory because of interference with the vehicle suspension system or other vehicle parts.

The novel safety brake mechanism of the present invention is so compact that it can be readily incorporated within the available space.

The wheel spindle 110 in the embodiment of FIGURE 4 rotatively supports a wheel hub 112 on spaced antifriction bearings 114 and 116. A brake drum assembly 118, like the assembly 38, has a transverse wall secured as by studs or by welding to a drive flange 120 thus forming an enclosed chamber 122. An O-ring seal 123 is provided between the brake drum and wheel hub. Drive flange 120 is splined to a wheel drive shaft 124 which extends through the spindle 110 for drive connection as described above.

Splined to the end of the spindle 110 is a support or spider 126 secured against axial movement by a plate 128 and retained in the manner previously described. As before, a bearing retainer 129 is provided on the spindle in abutment with the inner race of wheel bearing 114 to permit removal of the spider 126 and the brake mechanism while the vehicle wheels are on the ground. The spider 126 forms part of a brake mechanism 130 within chamber 122 and carries a brake shoe actuator housing 132 which contains a reciprocable wedge and roller mechanism 134 adapted to act on the brake shoes, not shown, in a manner described in the aforementioned U.S. Patent 3,037,584 to which reference is made for further detail.

The push rod 136 of the wedge mechanism 134 is attached to a piston 138 movable within chamber 140 which is part of the actuator housing 132. Piston 138 is normally held in retracted position by a spring 142 and in this position abuts against a push rod member 144 extending through an aperture 146 within a transverse wall 148 forming part of an indepedent safety brake housing 150 threaded onto the open end of actuator housing 132 thereby forming a closure for the chamber 140.

The push rod member 144 extends through chamber 152 formed by the housing 150 and is attached to or integral with a piston 154 which normally abuts a cover 156 screwed onto housing 150 to close chamber 152. Push rod member 144 is a hollow cylindrical structure which receives a compressed spring 158 rearwardly abutting against cover 156 and thereby tending to move push rod member 144 inwardly of chamber 140 of the service actuator housing 132 in brake applying direction.

A tie rod mechanism 160 provided with a nut 161 locked against rotation by a sleeve 163 may be provided within spring 158 for adjusting purposes and to manually compress the spring 158.

The piston 154 and with it the push rod member 144 is normally held in retracted position by fluid pressure acting against the force of the spring 158, this pressure being introduced into chamber 152 by means of fluid inlet 162 within wall 148 which is connected by a fitting 164 to a conduit 166 for fluid communication with the vehicle braking system. It will be understood that fluid communication is through the spindle 110 in the same manner as shown in FIGURE 1.

Chamber 140 of the service actuator 132 is connected for fluid communication by an inlet port 168 in wall 148 which is likewise connected to the vehicle braking system in the same manner as described in connection with FIGURE 1.

During service brake application, fluid under pressure is introduced through inlet 168 into chamber 140 causing piston 138 to move the wedge mechanism 134 in brake applying direction. During this movement the piston 154 and push rod member 144 of the safety brake housing 150 remain inactive. However, in case of service brake failure, that is, loss of fluid pressure in the system, the spring 158 expands and thereby advances push rod member 144 into chamber 140 acting on piston 138 to apply the brakes. Restoration of the normal fluid pressure in the system again caused safety brake piston 154 to retract and thereby compress spring 158 and all parts assume the position shown in FIGURE 4.

By incorporation of a suitable valve in the braking system, fluid pressure in safety brake chamber 152 can be manually reduced to allow the spring 158 to expand to serve as a parking brake mechanism. For release the valve may be manipulated to again establish normal fluid pressure in chamber 152.

Thus, the present invention has provided a novel, compact brake and safety brake mechanism in an outboard wheel hub and brake drum assembly adaptable for heavy duty application.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A wheel and brake assembly comprising a spindle, inner and outer bearing assemblies on said spindle, a wheel hub having a peripheral radial flange and a cylindrical outwardly facing pilot flange, a wheel rim assembly detachably secured to said radial flange, a sealed cover assembly detachably secured to said radial flange, said rim assembly and said cover assembly being independently removable from said flange, said cover assembly forming with said wheel hub a sealed enclosure, a brake drum rigid with said cover assembly, a portion of the inner surface of said drum being mounted on said pilot flange, a support member having a hub splined to said spindle and having a surface engageable with an inner race of said outer bearing assembly, a retainer plate detachably secured to the outer end of said spindle for retaining said support plate on said spindle, said retainer plate and said support member being movable axially of said spindle for adjustment of said bearing assemblies, brake assemblies carried by said support plate, and additional retainer means independent of said retainer plate for holding said wheel on said spindle whereby said cover assembly and said brake assemblies may be removed while said wheel hub and wheel are retained in place on said spindle.

2. The wheel and brake assembly according to claim 1 together with an actuator assembly carried by said support plate within said cover assembly and connected to operate said brake assemblies, said actuator comprising a cylinder axially aligned with said spindle, and a service piston and an emergency piston within said cylinder.

3. The wheel and brake assembly according to claim 1 wherein said additional retainer comprises a retainer ring carried by said spindle axially outwardly of said inner bearing race of said outer bearing.

References Cited by the Examiner
UNITED STATES PATENTS

| | | | |
|---|---|---|---|
| 2,408,938 | 10/1946 | MacPherson | 188—206 X |
| 2,976,085 | 3/1961 | Grogan | 188—170 X |
| 3,037,584 | 6/1962 | Cox et al. | 188—78 |

DUANE A. REGER, *Primary Examiner.*